May 7, 1963
A. MILLER
3,088,395
COOKING UNIT
Filed March 9, 1960
3 Sheets-Sheet 1
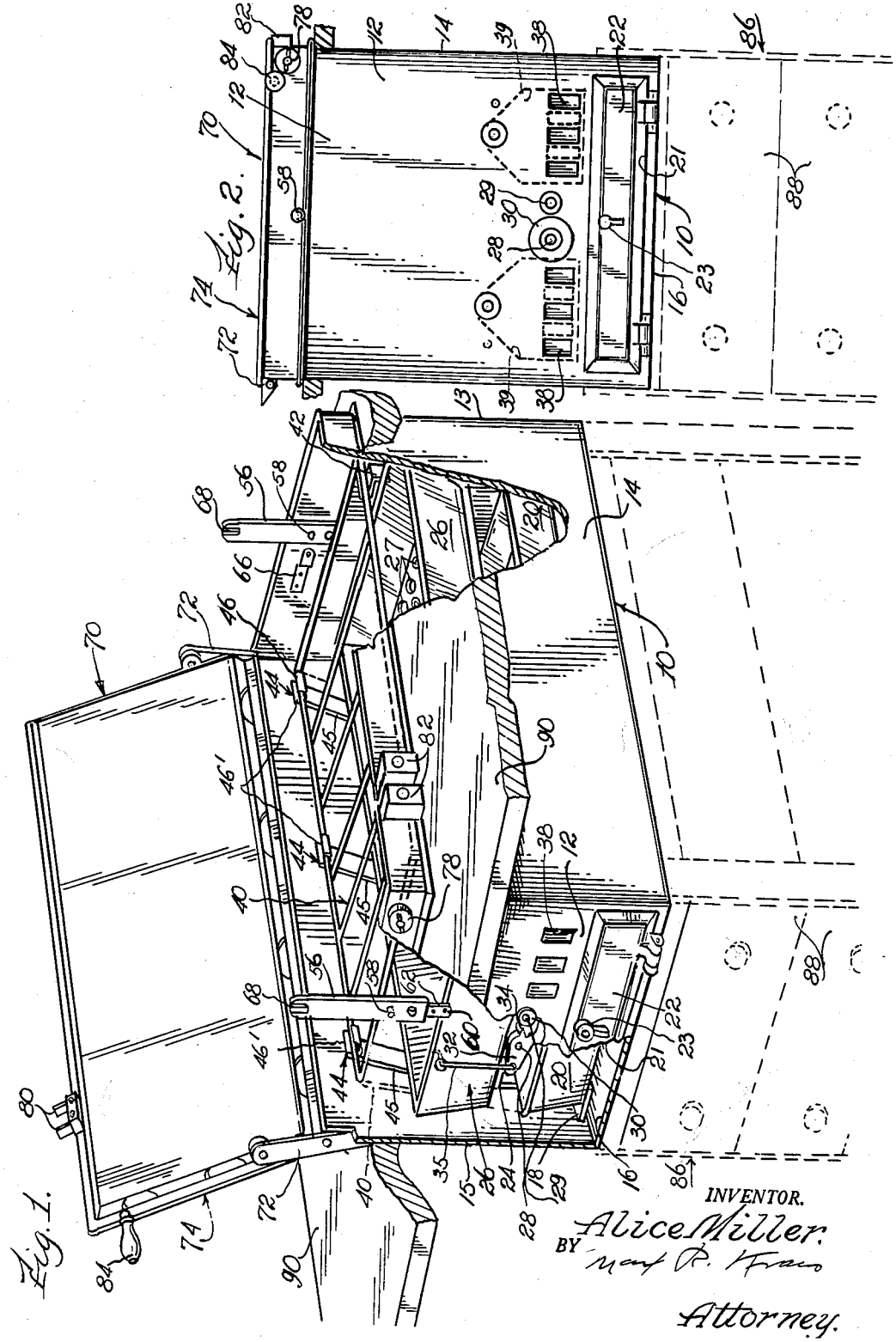
INVENTOR.
Alice Miller
BY
Mary R. Frans
Attorney.

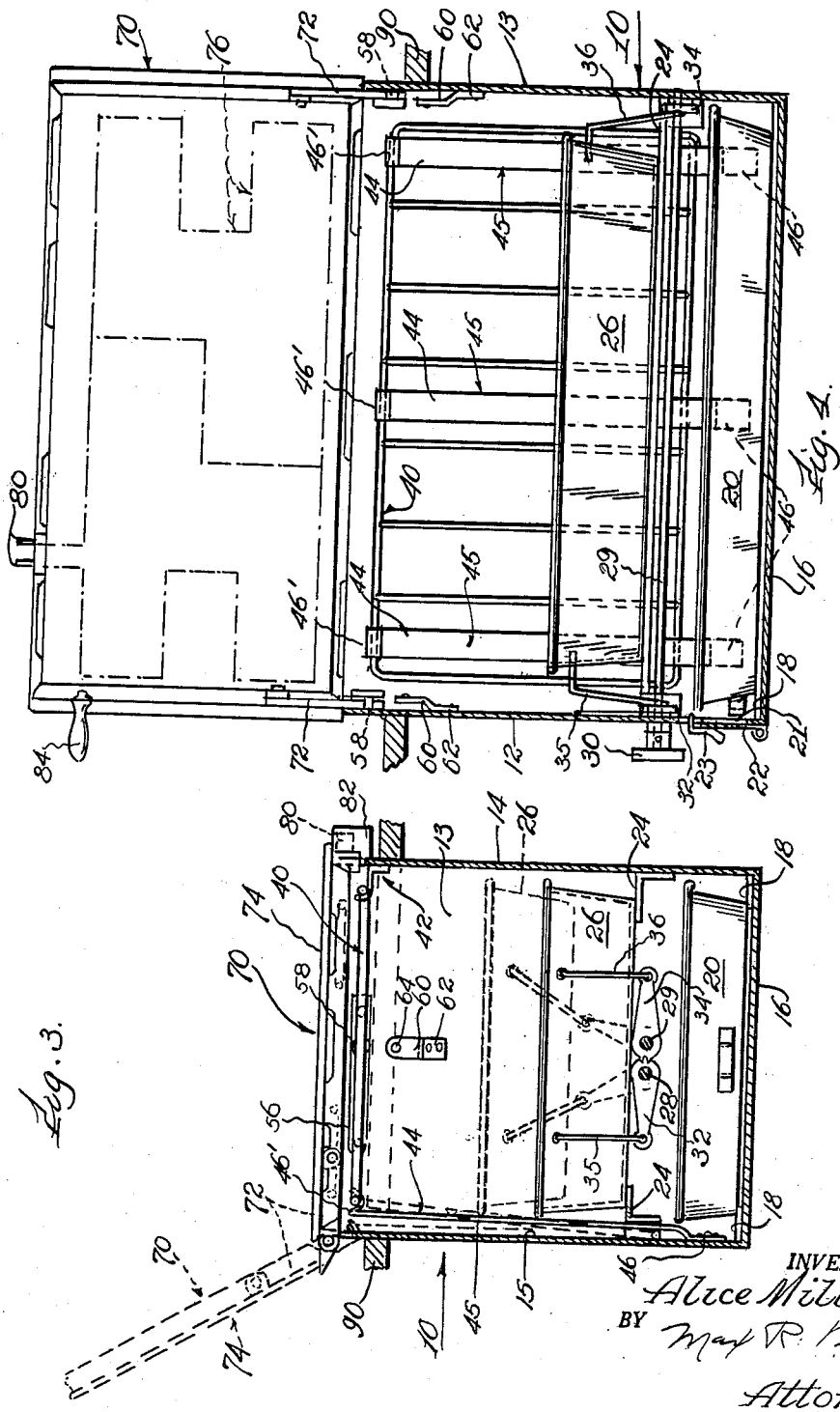

May 7, 1963 A. MILLER 3,088,395
COOKING UNIT
Filed March 9, 1960 3 Sheets-Sheet 3
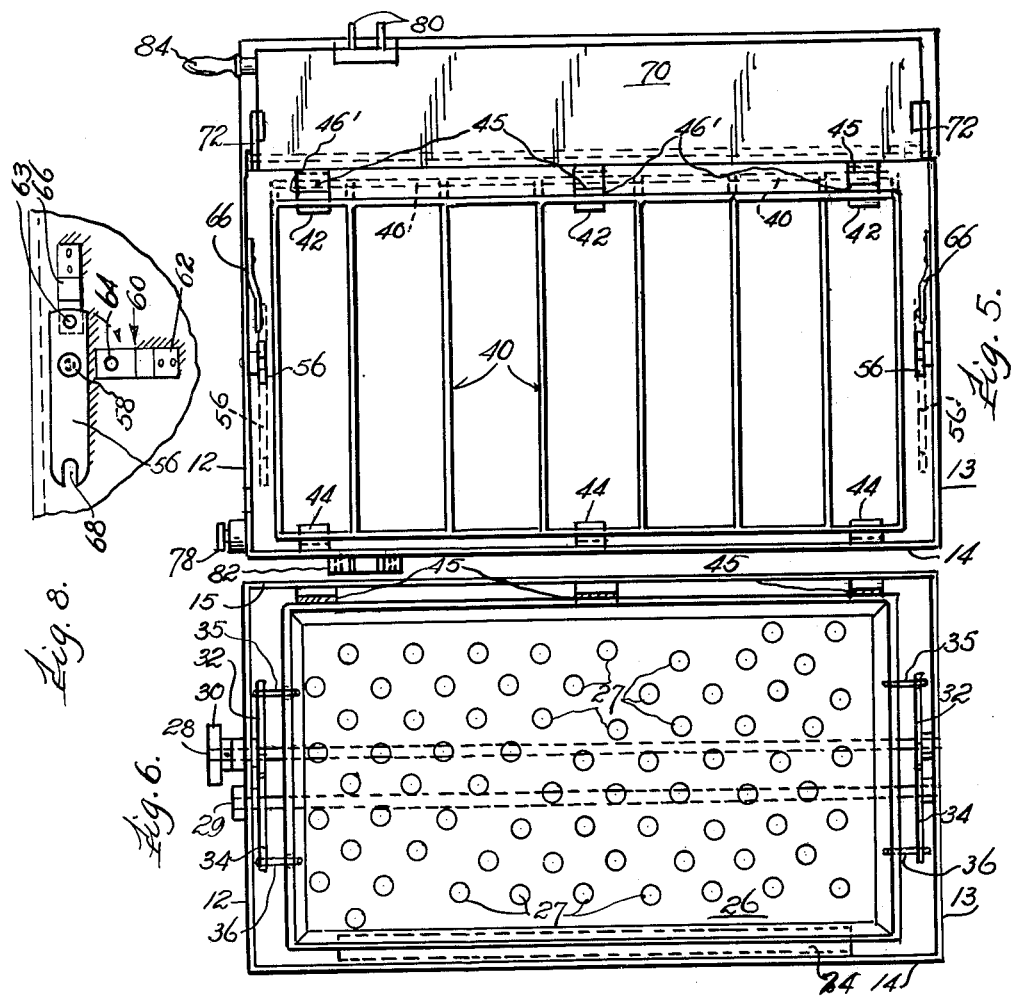
INVENTOR.
Alice Miller.
BY Max R. Frans
Attorney.

United States Patent Office 3,088,395
Patented May 7, 1963

3,088,395
COOKING UNIT
Alice Miller, 6752 N. Kedvale Ave., Lincolnwood, Ill.
Filed Mar. 9, 1960, Ser. No. 13,832
5 Claims. (Cl. 99—340)

This invention relates to an improved cooking unit that is adaptable for use in the kitchen of the home.

As is well known, a cooking stove, either gas or electrically operated, is essential equipment in the kitchen of every home; however, a cooking unit which utilizes charcoal or the like and provides an open flame for barbecuing and broiling is generally not standard cooking equipment in the kitchen. One of the objects of this invention is to provide such a construction for use in the kitchen which is compact, efficient and of great utility.

Another object of this invention is to provide a cooking unit which may be selectively used for barbecuing and/or broiling and which may also be used as a griddle.

Other objects will become apparent as this description progresses.

In the drawings:

FIGURE 1 is a perspective view of the unit, partly broken away, with the cover in open position.

FIGURE 2 is a front elevational view of same with the cover in closed position.

FIGURE 3 is a detail sectional elevation with the front wall cut away.

FIGURE 4 is a longitudinal section of the unit with the cover in open position and showing digrammatically in dotted lines the wiring and heating elements in the closure forming the griddle.

FIGURE 5 is a top plan view showing the gridiron in horizontal position.

FIGURE 6 is a top plan view showing the fuel, fire, or coke pan.

FIGURE 7 is a front elevational view of the closure and griddle member.

FIGURE 8 is a detail of the upright for the spit in non-use or collapsed position, and FIGURE 9 is a view of a conventional spit for barbecuing.

The unit comprises a housing, generally indicated at 10, of rectangular shape and having front and rear walls 12 and 13, opposite side walls 14 and 15 and a bottom wall 16, all formed of metal.

Suitably supported on spacers 18 on the bottom wall 16 is an ash pan 20 which is removable through an opening 21 in the bottom of the front wall 12 of the housing. The opening 21 is closed by a pivotally mounted door 22 having conventional locking means 23.

Fixedly secured to the side walls 14 and 15 of the housing above the ash pan are right angled braces 24 which support a fuel pan 26 for receiving the charcoal or the like. The bottom of the fuel pan is provided with a plurality of spaced openings 27 so that the ash of the burnt fuel can drop into the ash pan 20 directly below.

The fuel pan 26 is capable of being raised above the supporting braces 24 for the purpose of elevating the fuel pan 26 when a greater intensity of heat is desired for barbecuing or broiling food. The structure for accomplishing this is best shown in FIGURES 1, 3 and 4.

A pair of shafts 28 and 29 extend between the front and rear walls 12 and 13 of the housing and are rotatably supported thereby. The front end of shaft 28 extends forwardly of the front wall of the housing and has a knob 30 secured thereto. Fixedly secured to the front and rear ends of shaft 28 inside the housing are levers 32. Fixedly secured to the front and rear ends of shaft 29 are levers 34. The levers 32 and 34 each have teeth in engagement with each other. Wire members 35 and 36 connect the levers 32 and 34 respectively to the fuel pan 26.

FIGURE 3 shows the two front levers 32 and 34 and their wire members 35 and 36 connected to the front end wall of the fuel pan. Two identical levers and their corresponding wire members are similarly connected to the rear wall of the fuel pan. By manually engaging the knob 30 and rotating same the levers 32 and 34 and their wire members will be moved to the dotted line position of FIGURE 3 to elevate the fuel pan 26 and thereby bring it in a closer relationship to the food product to be heated. By rotating the knob 30 in the opposite direction the fuel pan is lowered to rest on the supporting braces 24. The fuel pan 26 may also be elevated to any intermediate position between that shown in full lines and that shown in dotted lines in FIGURE 3.

As best shown in FIGURE 2, the front wall 12 of the housing is provided with draft openings 38 and draft regulators 39 shown in dotted lines.

A gridiron 40 for broiling meat and the like is supported inside the housing above the fuel pan 26 in the manner now to be described.

Secured to the inside of the side wall 14 of the housing are a plurality of spaced rigid brackets 42 which support one side of the gridiron 40. The opposite side of the gridiron is supported by flexible brackets generally designated by the numeral 44. Each of the flexible brackets is formed of an elongated spring metal strip 45 which is spaced from the side wall 15 and is secured at its lower end as at 46 to said side wall, as best seen in FIGURE 3. The upper end of the strip is hook shaped as at 46′ to engage the longitudinal bar of the gridiron 40.

As shown in FIGURES 1, 3 and 5 the gridiron 40 is supported in a horizontal position over the fuel pan 26 to receive meat, steaks and the like for broiling. However, when it is desired to use the spit for barbecuing, the gridiron 40 is readily moved to an out of the way vertical position, as shown in FIGURE 4 and in dotted lines in FIGURE 3. The gridiron 40 in its horizontally supported position is disengaged from the brackets 42 and 44 and is slipped vertically into the space between the side wall 15 and metals strips 45 and the longitudinal end bar of the gridiron 40 is hooked on to the hooks 46 to thereby support the gridiron in its out of the way position. The gridiron may be readily attached to the brackets 42 and 44 for its horizontal support position.

The spit, generally indicated at 48, and shown in FIGURE 9, is of conventional construction and comprises a rod 49 having a handle 50 at one end thereof for manually rotating same. Conventional gripping members 52 for engaging the meat to be barbecued are slideably supported on the rod. The rod is also provided with a gear 54 adapted to be engaged by suitable drive means, not shown, for mechanically rotating the spit.

In accordance with this invention, the spit 48 is supported on a pair of uprights 56 which are retractable to out of the way position when not in use or when the cover member to be subsequently described is in closed position. The uprights are best shown in FIGURES 1 and 8. One of each of such uprights is pivotally secured as at 58 to the inside of the front and rear walls 12 and 13 of the housing. The upright 56 is thus swingable to its upright position shown in FIGURE 1 and to its collapsed position shown in FIGURE 8.

Below the pivotal connection 58 of the upright is a locking member generally designated at 60 which comprises a strip of spring metal which is secured as at 62 to the wall of the housing and which is bent or offset inwardly. The lower end of the upright has a raised portion 63 which seats and locks in a concaved portion 64 in the locking member 60 to lock the upright in upright position.

To the side of the pivotal connection there is secured to the inside of the side wall another locking member, generally indicated at 66, which is identical to locking member 60, which engages the upright, as shown in FIGURE 8, to lock the upright in a horizontal or out of the way position below the top of the housing. The outer end of each of the uprights has an open ended slot 68 to receive the spit 48 when the uprights are in upright position, as shown in FIGURE 1.

The top of the housing is closed by a metal cover member generally designated at 70. The cover member is suitably hinged to the side wall of the housing to permit the cover to be pivoted to open or closed position, as shown respectively in FIGURES 1 and 2. The cover is held in open position, as shown in FIGURE 1, by any conventional means, such as links 72 having one end secured to the cover and the opposite end secured to the housing. The cover member not only serves as a closure for the housing but also serves to contain the electrical heating elements and components for the griddle.

The griddle which is generally designated by the numeral 74 is combined with the cover member so that the top or exposed portion of the cover when closed, as shown in FIGURE 2, forms the griddle. The heating and wiring elements, not shown in any particularity but schematically outlined by dotted lines in FIGURE 4, and designated at 76, are of conventional construction and are suitably contained and supported inside the cover with suitable insulation. A suitable manual switch 78 is used for opening and closing the circuit for operating the griddle, however, switch 78 will not close the circuit when the cover is in open position, as shown in FIGURE 1. There is provided a pair of spaced contact fingers 80 on the cover which are connected in the circuit 76.

The side wall of the housing is provided with spaced electrical conducting elements 82 which are engaged by the spaced contact fingers 80 to close the circuit in the griddle so that if the manual switch 78 is closed the circuit is established to operate the heating elements for the griddle. With the cover in open position, as in FIGURE 1, the heating elements cannot operate, even if the manual switch is closed. A handle 84 is secured to the cover to facilitate opening and closing of same. The circuit 76 has a conventional outlet (not shown) and is connected by a suitable plug to a source of current supply.

With this invention there is provided in a single compact structure, a broiling and barbecuing unit and a griddle which may be permanently installed in the kitchen of a home.

For permanent installation in the kitchen, the unit of this invention is mounted and supported on a base 86, best shown in dotted lines in FIGURES 1 and 2, provided with a plurality of drawers 88 for storage or the like. The unit is preferably positioned in a modern kitchen adjacent a conventional cooking stove with the top of this unit on substantially the same plane as the cooking stove. Suitable kitchen working or counter space 90 is also provided.

It will be understood that various changes and modifications may be made without departing from the spirit and scope of the appended claims.

I claim:

1. A device of the character described comprising a housing having vertical walls and a door in one of said walls, a fuel pan inside said housing, a removable ash pan positioned inside said housing below said fuel pan and adjacent said door to be removed through said door, a gridiron supported within said housing above said fuel pan in horizontal position, a pair of uprights secured to the vertical walls of said housing and extending above the top of said housing when in spit supporting position, means mounting said uprights for movement below the top of said housing but positioned adjacent the vertical walls of said housing when in non-spit supporting position, a spit removably positioned on said uprights when in spit supporting position, a closure horizontally positioned over the top of said housing, said closure having electrically operated means to permit use of said closure as an electric griddle when the closure is in closed position.

2. A structure defined in claim 1 in which the gridiron is releasably mounted in said housing so that it may be moved from a horizontal position to a vertical non-use position adjacent one the vertical walls of the housing.

3. A structure defined in claim 1 in which rotatable means are provided for raising and lowering the fuel pan with respect to the gridiron.

4. A structure defined in claim 2 in which rotatable means are provided for raising and lowering the fuel pan with respect to the gridiron when the gridiron is in horizontal position.

5. A structure defined in claim 1 in which the uprights are pivotally secured to two opposite vertical walls adjacent the upper ends of said walls.

References Cited in the file of this patent

UNITED STATES PATENTS

| | | |
|---|---|---|
| 1,535,637 | Venetz | Apr. 28, 1925 |
| 2,114,698 | Babin | Apr. 19, 1938 |
| 2,291,359 | Uhlrig et al. | July 28, 1942 |
| 2,430,582 | Reich | Nov. 11, 1947 |
| 2,477,529 | Sprinkle et al. | July 26, 1949 |
| 2,718,845 | Dudley | Sept. 27, 1955 |
| 2,780,215 | Vacanti | Feb. 5, 1957 |
| 2,866,883 | Borden | Dec. 20, 1958 |